(12) United States Patent
Ramsey

(10) Patent No.: US 7,952,026 B2
(45) Date of Patent: May 31, 2011

(54) ANGLED STABS FOR A BUSWAY PLUG IN UNIT

(76) Inventor: Jim Ramsey, Murfreesboro, TN (US)

( * ) Notice: Subject to any disclaimer, the term of this patent is extended or adjusted under 35 U.S.C. 154(b) by 194 days.

(21) Appl. No.: 12/489,173

(22) Filed: Jun. 22, 2009

(65) Prior Publication Data

US 2010/0319954 A1 Dec. 23, 2010

(51) Int. Cl.
*H02G 5/00* (2006.01)

(52) U.S. Cl. ............. 174/68.2; 174/70 B; 174/71 B; 174/88 B; 174/129 B; 174/133 B; 439/211; 439/213; 361/624

(58) Field of Classification Search ............. 174/68.2, 174/70 B, 71 B, 72 B, 129 B, 133 B; 361/624; 439/211, 212, 213
See application file for complete search history.

(56) References Cited

U.S. PATENT DOCUMENTS

| | | | | |
|---|---|---|---|---|
| 5,401,906 A * | 3/1995 | Bryant | ............. | 174/88 B |
| 5,466,889 A | 11/1995 | Faulkner et al. | ............. | 174/68.2 |
| 5,619,014 A | 4/1997 | Faulkner | ............. | 174/68.2 |
| 6,142,807 A | 11/2000 | Faulkner | ............. | 439/212 |
| 6,180,885 B1 * | 1/2001 | Goldman et al. | ............. | 174/68.2 |
| 7,285,724 B2 * | 10/2007 | Buettner | ............. | 174/70 B |
| 7,759,577 B1 * | 7/2010 | Morales | ............. | 174/68.2 |

OTHER PUBLICATIONS

Square D, Distribution Equipment Fundamentals, *Terms and Concepts Fundamental to the Understanding of Square D Distribution Equipment and Its Application*, dated at least as early as Dec. 31, 1989, (11 pages).
Eaton, Cutler-Hammer, *Low Voltage Busway Pow-R-Way III*, date Oct. 2006, (16 pages).
Square D, *Busway System*, Catalog 5600CT9101R8/08, dated May 2009, (138 pages).
Siemens, *Storage, Installation, and Maintenance Instructions for SENTRON™ High Amp Busway System*, date unknown, (15 pages).

* cited by examiner

*Primary Examiner* — Dhiru R Patel

(57) ABSTRACT

A busway system includes a plurality of busbars arranged in a flat stacked configuration. The system further includes at least one uninsulated stab having a base in direct contact with one of the busbars at a first length portion of the busbars. The stab also has a tip extending away from the base and angled at the length of the busbars such that the tip is positioned at least in part at a second length portion of the busbars. The stab is insulated from other stabs via one or more of a MYLAR® sheet and a wall of a plug-in opening base.

20 Claims, 9 Drawing Sheets

US 7,952,026 B2

ANGLED STABS FOR A BUSWAY PLUG IN UNIT

FIELD OF THE INVENTION

This invention is directed generally to a busway system, and, more particularly, to a busway with angled stabs separated by an insulation sheet.

BACKGROUND OF THE INVENTION

Busway electrical distribution systems are well known in the art of electrical distribution. Busway systems are comprised of a number of factory assembled sections each including a number of individually insulated generally flat electrical conductors or busbars stacked one upon another and enclosed within a housing which provides protection and support for the busbars. The busway sections include one or more plug-in openings having a plurality of conductive stabs. In general, the plug-in openings are openings provided through the housing of the busway system at each of a plurality of power tap-off sections to expose conductive material of the busbars for connection with an appropriate connecting jaw. A plug-in unit, which is used to tap off power from the busway, is attached to the plug-in opening by mounting a plurality of jaws to a corresponding stab.

To comply with Underwriters Laboratories Inc. ("UL") requirements, uninsulated stabs must be separated by at least 2 inches at a base of the stab to achieve a required over-surface clearance. Similarly, uninsulated stabs must be separated by at least 1 inch at a tip of the stab to achieve a required over-air clearance.

Some current busbars are required to include insulated stabs because the respective configurations cannot meet the UL requirement of providing a 2-inch over-surface clearance or a 1-inch over-air clearance. To provide proper insulation, an epoxy coating is generally applied on all surfaces of the bars. However, epoxy insulation is labor intensive, time consuming, and expensive. Furthermore, epoxy insulation may have cracks and uneven thickness around corners and bends.

What is needed, therefore, is a stab configuration for a busway that addresses the above-stated and other problems.

SUMMARY OF THE INVENTION

In an implementation of the present invention, a busway system includes a busway housing and a plurality of busbars arranged in a flat stacked configuration. The busbars are located at least in part within the housing and include a first busbar, a second busbar, a third busbar, and a fourth busbar. The system further includes at least one plug-in opening with a plurality of uninsulated stabs, including a first pair of uninsulated stabs and a second pair of uninsulated stabs. The first pair of uninsulated stabs includes a first upper stab having a first upper base attached directly to the first busbar at a first length portion of the busbars. The first upper stab has a first upper tip extending away from the first upper base. The first pair of uninsulated stabs further includes a first lower stab having a first lower base attached directly to the third busbar at the first length portion of the busbars. The first lower stab has a first lower tip extending away from the first lower base.

The second pair of uninsulated stabs includes a second upper stab having a second upper base attached directly to the second busbar at a second length portion of the busbars. The second upper stab has a second upper tip extending away from the second upper base. The second pair of uninsulated stabs further includes a second lower stab having a second lower base attached directly to the fourth busbar at the second length portion of the busbars. The second lower stab has a second lower tip extending away from the second lower base. Each one of the first upper tip and the first lower tip is angled at a third length portion of the busbars toward the second upper tip and the second lower tip. The third length portion of the busbars is located between the first length portion of the busbars and the second length portion of the busbars.

In an alternative implementation of the present invention, a busway system includes a plurality of busbars and a left upper stab, which is an uninsulated stab. The plurality of busbars are arranged in a flat stacked configuration, the busbars having a respective length and width. The left upper stab has a left upper base in direct contact with one of the busbars at a first length portion of the busbars. The left upper stab also has a left upper tip extending away from the first upper base and angled at the length of the busbars such that the left upper tip is positioned at least in part at a second length portion of the busbars.

One advantage of the busway system described in the present application is that the busway system retrofits to existing equipment, eliminating a need for redesigning, e.g., new jaw locations for plug-in units. Another advantage is directed to eliminating a need for using relatively expensive methods of insulating busbar stabs, such as methods using epoxy to insulate busbar stabs. Yet another advantage is directed to improving thermal efficiency of the busway system by eliminating air gaps present in present busway designs.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1A:
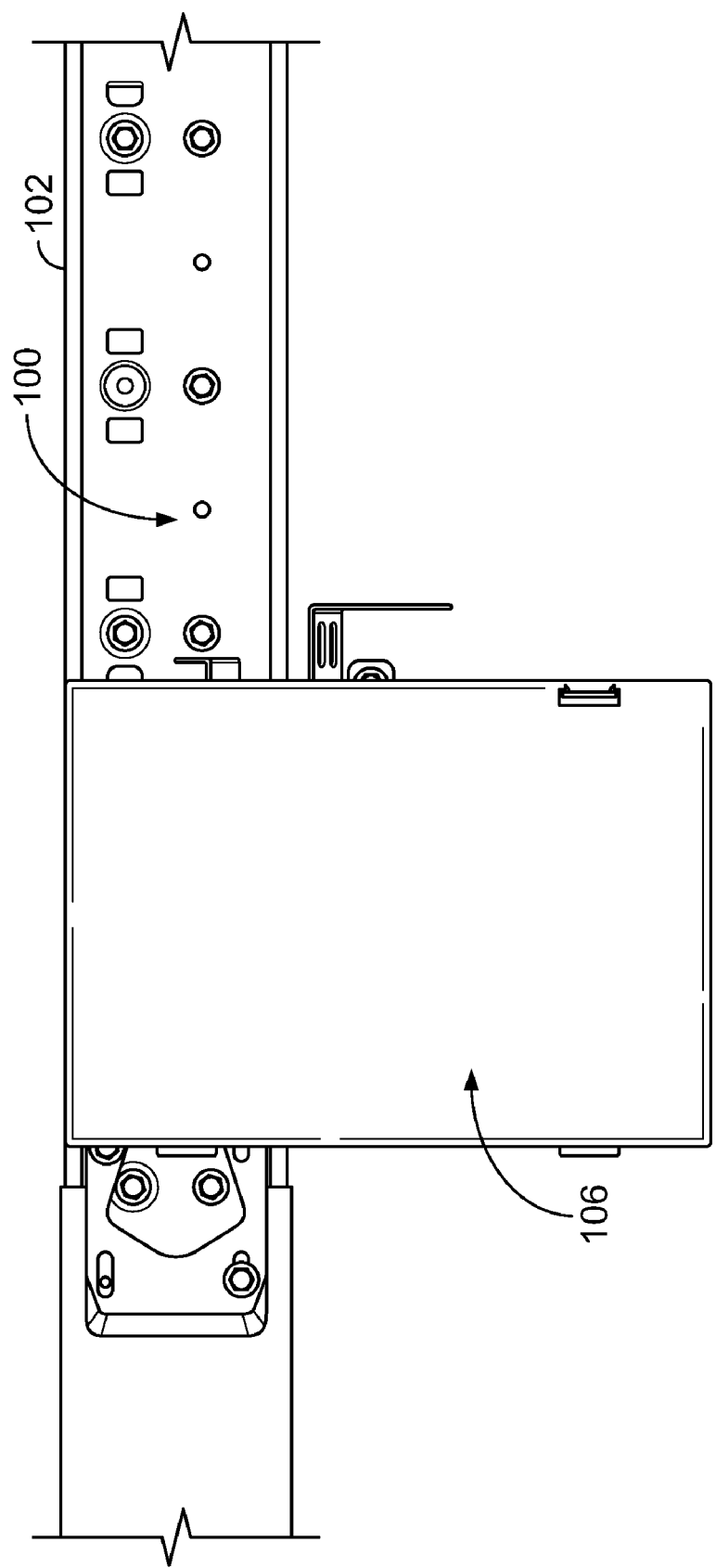
FIG. 1A is a perspective view of a busway system.

Referring to FIG. 1A, a busway system 100 includes a busway housing 102 in which one or more plug-in openings 104 (illustrated in FIG. 1B) are located. A plug-in unit 106 is mounted to the busway system 100 in a horizontal application, according to one embodiment.

Figure 1B:
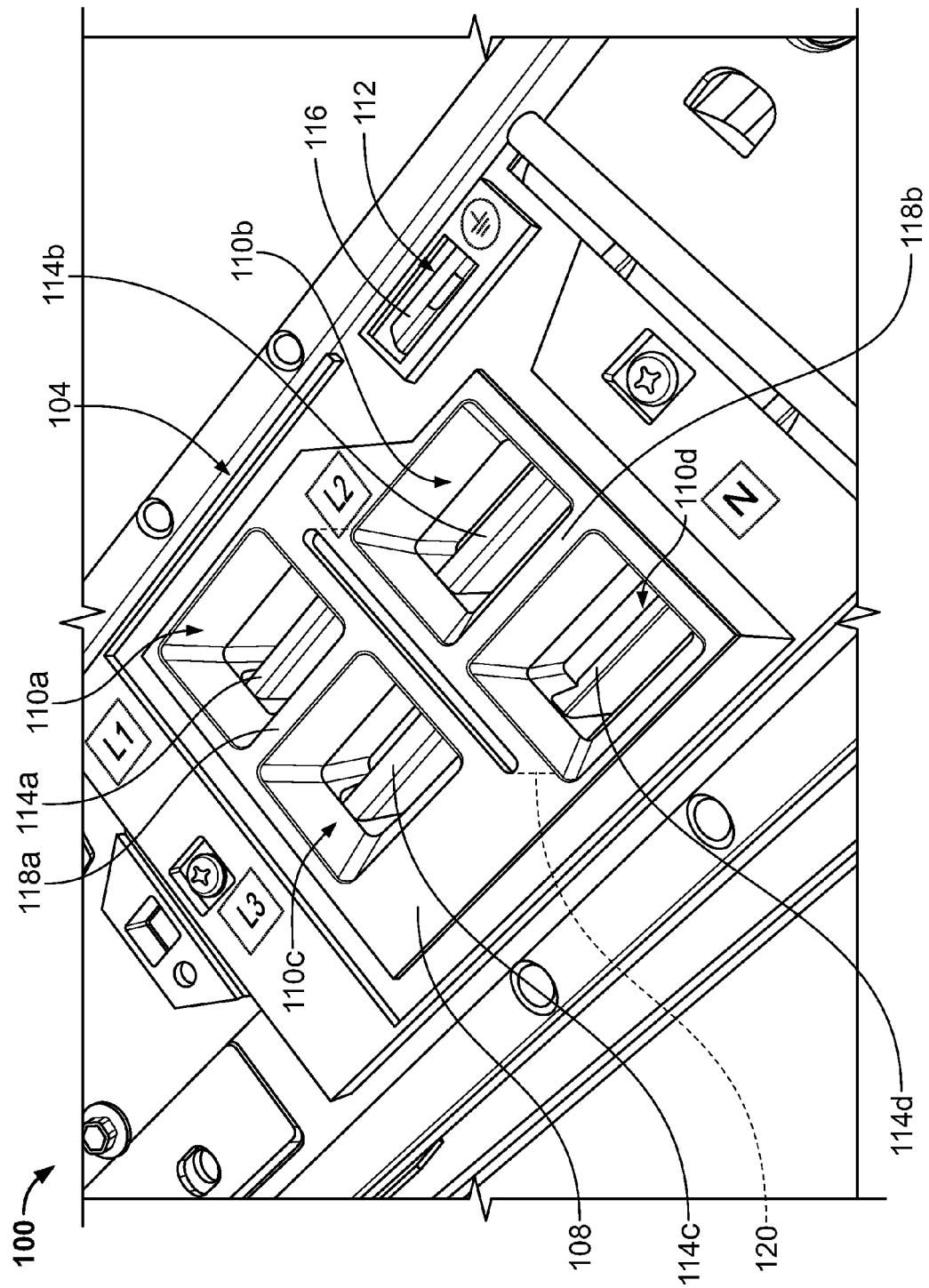
FIG. 1B is a front perspective view of a busbar with stabs of the system of FIG. 1A.

Referring to FIG. 1B, the plug-in opening 104 includes a molded plastic base 108 having a plurality of stab apertures 110a-110d and a ground aperture 112. Each of the stab apertures 110a-110d has a corresponding uninsulated stab 114a-114d extending from a respective busbar (shown in FIG. 2 as busbars 200a-200b) of the busway system 100. The stabs 114a-114d include a Phase A ("L1") stab 114a, a Phase B ("L2") stab 114b, a Phase C ("L3") stab 114c, and a Neutral ("N") stab 114d. The ground aperture 112 corresponds to a ground receptacle 116 providing a ground connection for the plug-in unit 106.

According to one embodiment, the stabs 114a-114d are fabricated integrated with the busbars 200a-200d via an extruded or formed roll stock material. Alternatively, the stabs 114a-114d are welded as separate components to the busbars 200a-200b.

The molded plastic base 108 further includes a pair of first plastic walls 118a, 118b for separating the L1 stab aperture 110a from the L3 stab aperture 110b and the L2 stab aperture 110c from the N stab aperture 110d. According to one embodiment, the molded plastic base 108 also includes a second plastic wall 120 for separating and insulating the pair of L1 stab 114a and L3 stab 114c from the pair of L2 stab 114b and N stab 114d.

Figure 1C:
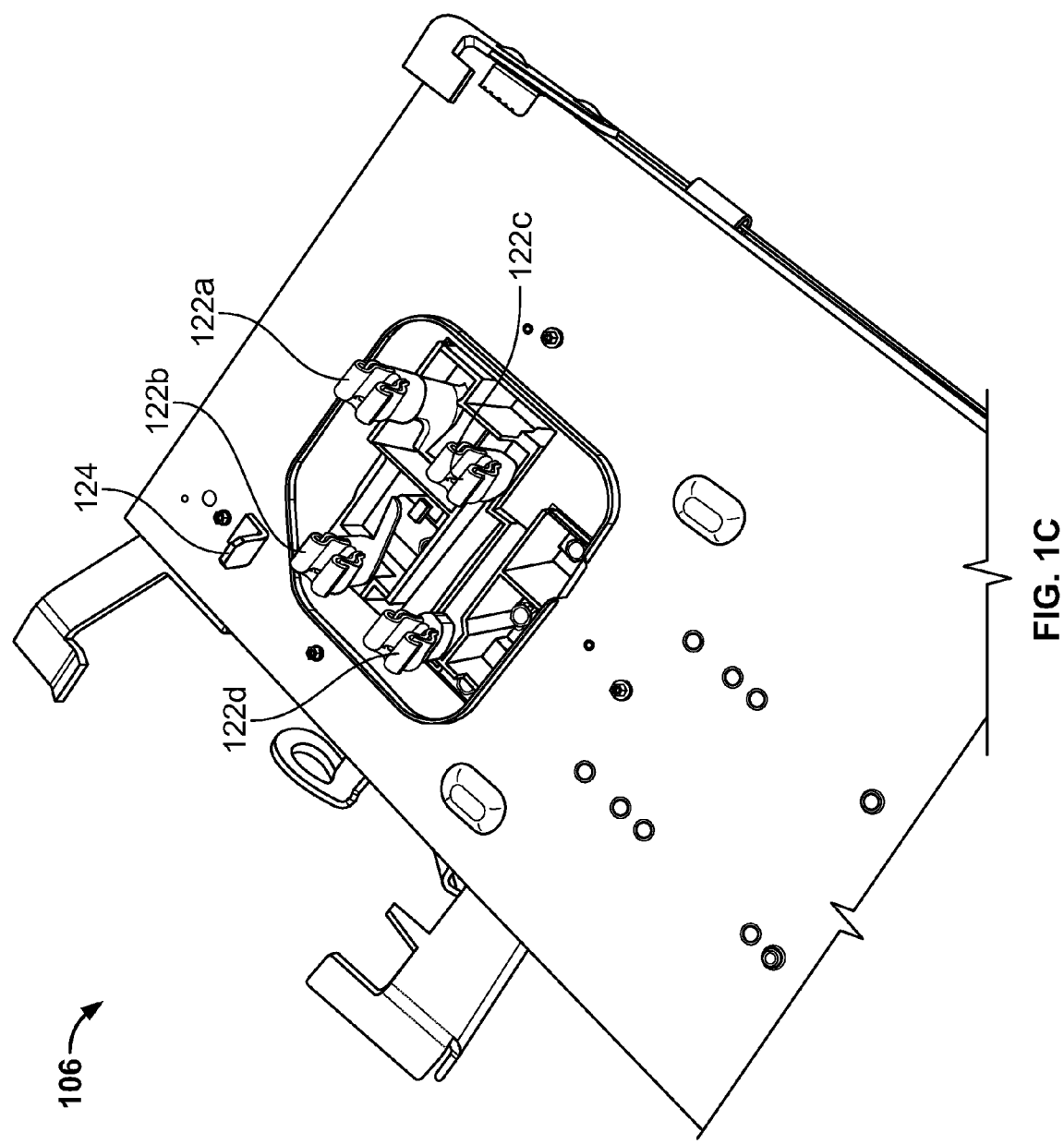
FIG. 1C is a rear perspective view of a plug-in unit with jaws of the system of FIG. 1A.

Referring to FIG. 1C, the plug-in unit 106 includes a set of electrical jaws 122a-122d and a ground stab 124. According to some embodiments, the plug-in unit 106 can include 30 Amp.-600 Amp. Fusible units and 15 Amp.-600 Amp. Circuit Breaker units for controlling various electrical equipment, e.g. electrical motors, electrical light systems, etc.

The electrical jaws 122a-122d include a corresponding jaw for each of the stabs 114a-114d. Specifically, the electrical jaws 122a-122d include an L1 jaw 114a, an L2 jaw 114b, an L3 jaw 114c, and an N jaw 114d. Furthermore the ground stab 124 is adapted for engaging the ground receptacle 116.

Figure 1D:
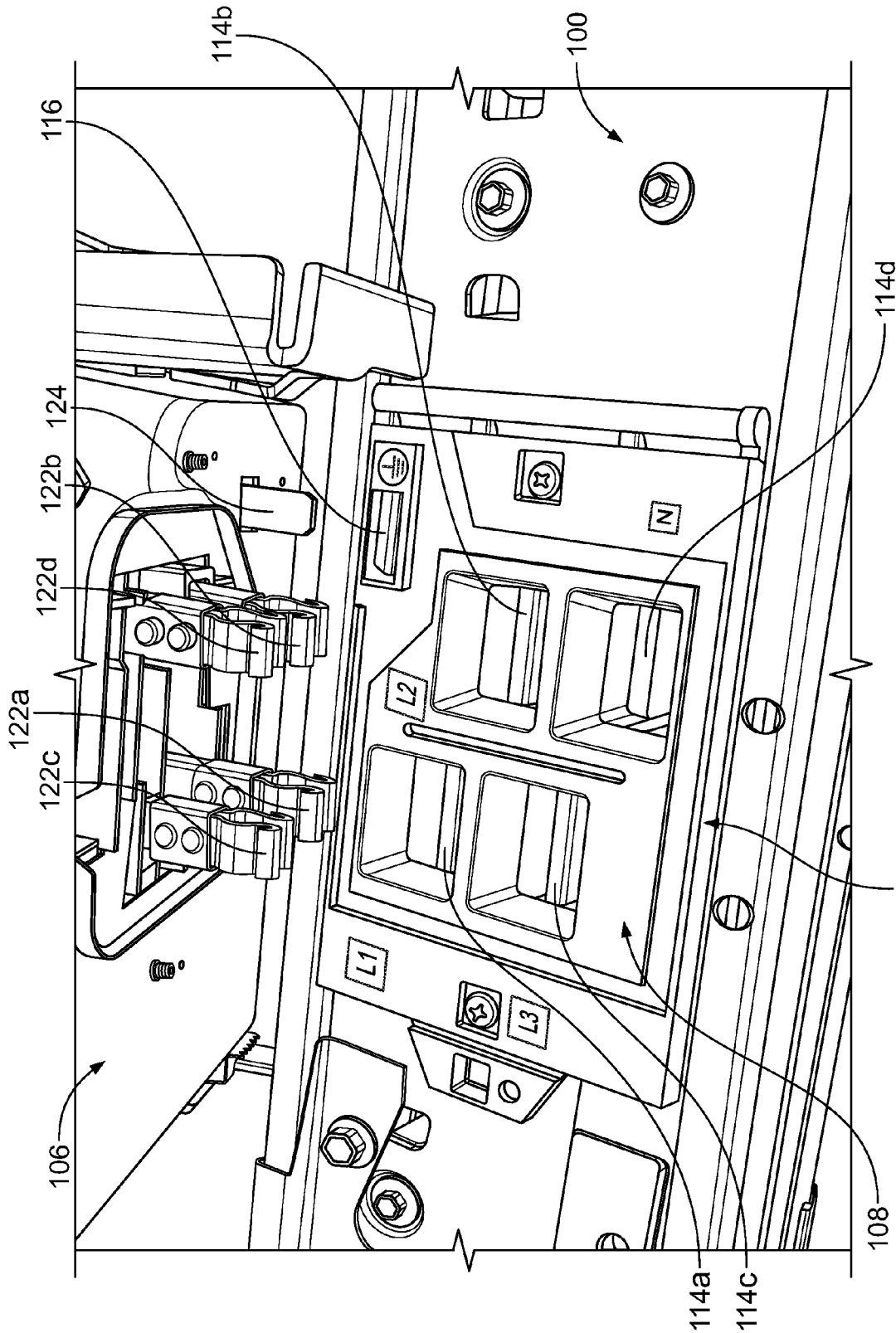
FIG. 1D is a perspective view illustrating coupling between the busbar and the plug-in unit of FIGS. 1B and 1C.

Referring to FIG. 1D, the plug-in unit 106 is shown as it is moved into position so that the electrical jaws 122a-122d can engage the corresponding stabs 114a-114d. To complete installation of the plug-in unit 106 to the busway system 100 (as illustrated in FIG. 1A), the plug-in unit 106 is pressed down against the plug-in opening 104 until each of the electrical jaws 122a-122d is fully engaged on the corresponding stab 114a-114d.

Figure 2:
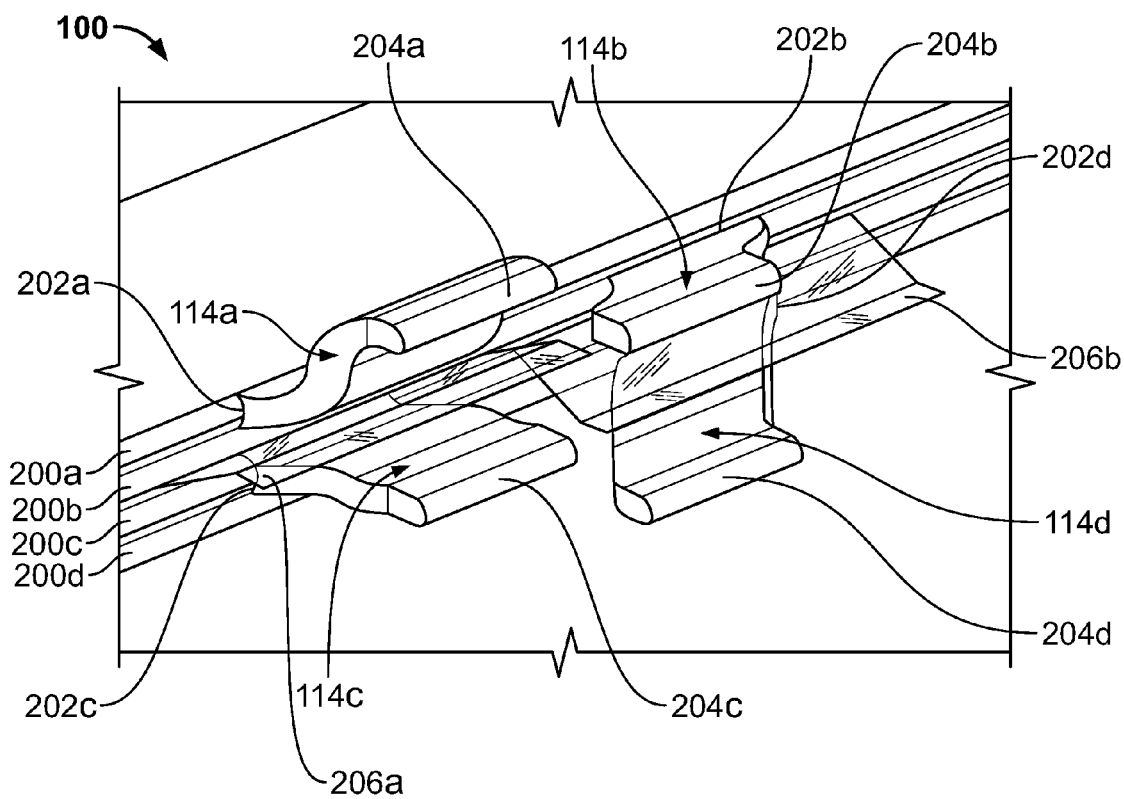
FIG. 2 is a side perspective view of busbar arrangement having uninsulated stabs and an insulation sheet, according to one embodiment.

Referring to FIG. 2, the busway system 100 includes a plurality of busbars 200a-200d, which includes an A-phase (L1) busbar 200a, a B-phase (L2) busbar 200b, a C-phase (L3) busbar 200c, and an N busbar 200d. The busbars 200a-200d are arranged in a flat stacked configuration and are located at least in part within the housing 102. The busbars 200a-200d are insulated, as explained in more detail below, using insulating sheets (e.g., MYLAR® stock material) inserted between the busbars.

According to other embodiments, the busway system 100 can include a different number of busbars. For example, the busway system 10 can include a fifth busbar that can be used for 200% Neutral and/or a sixth busbar that can be used as an "Isolated Ground."

The stabs 114a-114d described above extend from a corresponding busbar 200a-200d. Each of the stabs 114a-114d has a generally L-shaped form defined by a stab base 202a-202d and a stab tip 204a-204d. The L-shaped form is advantageous at least because it allows the busway system 100 to be used with existing plug-in unit units and to maintain clearance dimension requirements using uncoated/uninsulated stabs. For example, referring to the L1 stab 114a, the L1 stab base 202a forms one end of the L1 stab 114a that is in direct contact with the L1 busbar 200a, and the L1 stab tip 204a forms another end of the L1 stab 114a that is farthest from the L1 busbar 200a.

One advantage associated with the busway system 100, and, more specifically, with the stabs 114a-114d and the flat stacked configuration of the busbars 200a-200d, is that it provides a busway system that is thermally efficient the entire length of a busway section. Because the busbars 200a-200d are stacked on top of one another, air gaps are eliminated (which are present, for example, in a "humped" busway configuration such as Square D I-Line II Busway system). Improved thermal efficiency, i.e., conduction of heat directly from the busbars 200a-200d to the busbar housing 102, results in reduction of copper or aluminum in the busway system 100, which (in turn) translates in cost savings. For example, based on busway production of at least one manufacturer and relative to a particular volume and thermal performance of a particular design, a 5° C. reduction in temperature rise can result in an approximate annual copper savings of about $750,000.

For convenience purposes, the L1 stab 114a and the L3 stab 114c are also referred to as a first pair of uninsulated stabs 114a, 114c, wherein the L1 stab 114a is also referred to as the first upper stab 114a and the L3 stab 114c is also referred to as the first lower stab 114c. Also, the L2 stab 114b and the N stab 114d are also referred to as the second pair of uninsulated stabs 114b, 114d, wherein the L2 stab 114b is also referred to as the second upper stab 114b and the N stab 114d is also referred to as the second lower stab 114d. The first upper stab 114a and the first lower stab 114c are arranged in an overlapping manner (or configuration) with respect to each other. Similarly, the second upper stab 114b and the second lower stab 114d are arranged in an overlapping manner with respect to each other. In contrast, the first upper stab is arranged in a non-overlapping manner with respect to the second upper stab or the second lower stab. Similarly, the first lower stab is arranged in a non-overlapping manner with respect to the second upper stab or the second lower stab.

To comply with insulation-related UL requirements, the upper stabs 114a, 114b are insulated from the lower stabs 114c, 114d via an insulating sheet 206a, 206b, which includes a left insulating sheet 206a and a right insulating sheet 206b. The insulating sheet 206a, 206b extends from between two adjacent ones of busbars 200a-200d, such as from between the L2 busbar 200b and the L3 busbar 200c.

Figure 3:
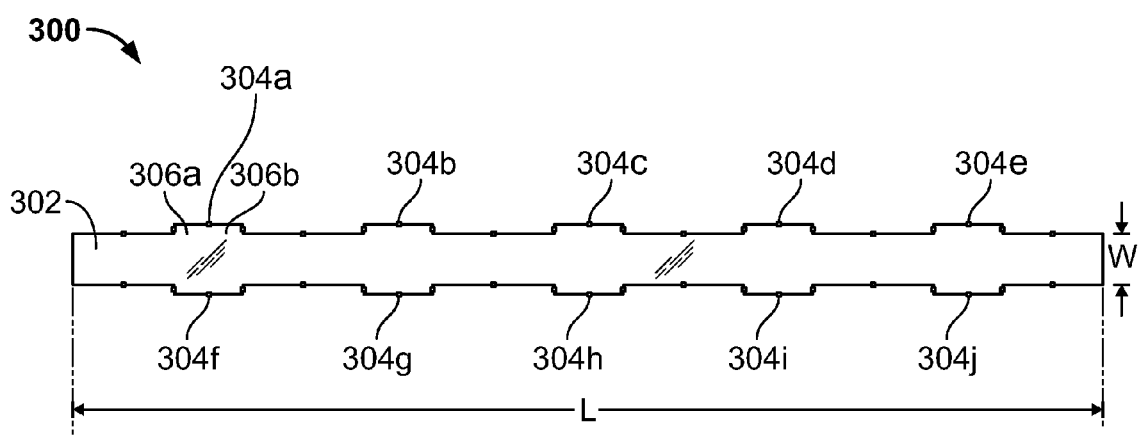
FIG. 3 is a top view of an insulating sheet, according to an alternative embodiment.

Referring to FIG. 3, an insulating sheet 300 includes a main body region 302 and plurality of insulating overhanging flanges 304a-304j extending from each side at predetermined intervals at the length ("L") of the insulating sheet 300. The main body region 302 is intended for insertion between two adjacent ones of the busbars 200a-200d and is dimensioned such that the width ("W") of the insulating sheet 300 is generally equal to the width of the busbars 200a-200d.

According to alternative embodiments, the insulating sheet 300 can also be placed between the busway housing 102 and the L1 busbar 200a (i.e., the top busbar) and/or between the busway housing 102 and the N busbar 200d (i.e., the bottom busbar).

The flanges 304a-304j extend away from the busbars 200a-200d when the insulating sheet 300 is assembled within the busbars 200b, 200c. The insulating flanges 304a-304j are intended to provide required insulation for complying with the insulation-related UL requirements. In general, the insulating flanges 304a-304j are configured to form a separating between two adjacent uninsulated stabs that do not meet, for example, the UL-required over-air clearance. One option for material for the insulating sheet 300 is a MYLAR® sheet stock material, which is relatively inexpensive compared to insulating material such as epoxy, does not require any additional initial capital investment, and can be assembled with the busbars 200a-200d in a relatively short period of time.

According to an alternative embodiment, at least one of the flanges 304a-304j is separated, such as by cutting, in a central area to form two adjacent stab flanges 306a, 306b. Each of the stab flanges 306a, 306b has a free end that is movable independent from the adjacent free end. As such, the stab flanges 306a, 306b can easily move in different directions from one another as moved (or controlled) by incoming walls of a plug-in opening base, such as the molded plastic base 108. One advantage provided by the separation of a flange 304a-304j into two stab flanges 306a, 306b is that it prevents interference with incoming plug-in unit jaws, such as the electrical jaws 122a-122d.

Figure 4A:
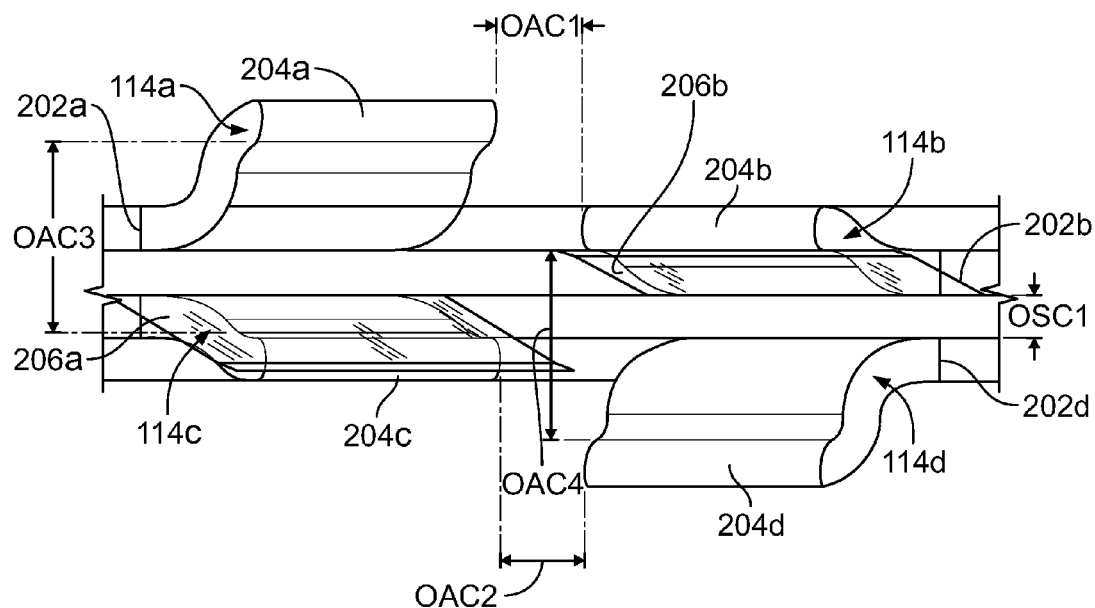
FIG. 4A is a front perspective view of the busbar arrangement of FIG. 2.
Figure 4B:
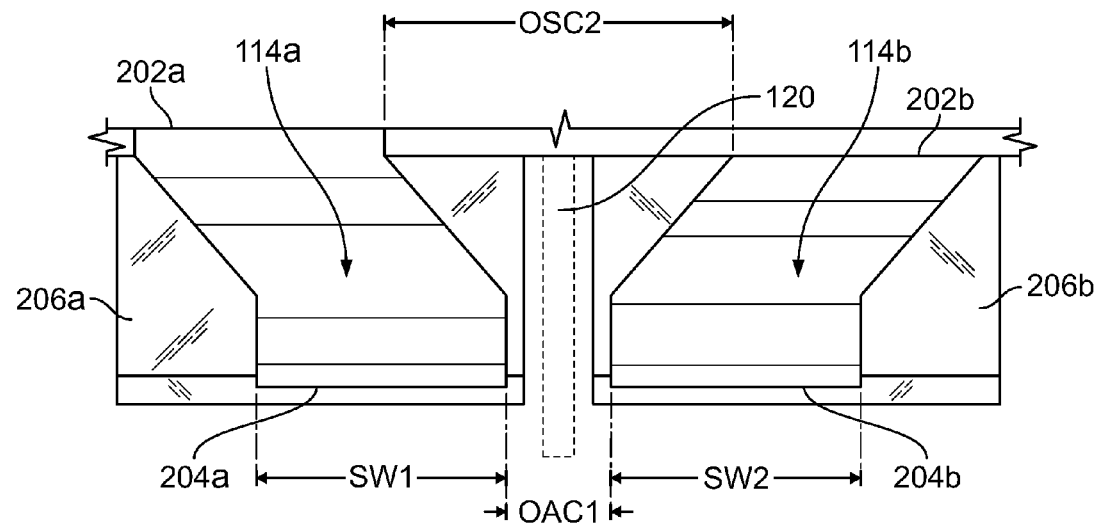
FIG. 4B is a top view of the busbar arrangement of FIG. 2.

Referring to FIGS. 4A-4B, the uninsulated stabs 114a-114d are angled such that the tips of the first pair of stabs 114a, 114c are closer to the tips of the second pair of stabs 114b, 114d than the respective bases of the stabs. For example, as more clearly illustrated in FIG. 4B, the clearance between the upper tip 204a of the first upper stab 114a and the upper tip 204b of the second upper stab 114b (illustrated as OAC1) is smaller than the clearance between the upper base 202a of the first upper stab 114a and the upper base 202b of the second upper stab 114b (illustrated as OSC2). The angled shaped of the stabs 114a-114d helps achieve this difference in clearances. For example, the upper base 202a of the first upper stab 114a may be separated from the upper base 202b of the second upper stab 114b by about 2 inches, but the stabs are angled towards each other such that a clearance of only about 0.5 inches separates the upper tip 204a of the first upper stab 114a from the upper tip 204b of the second upper stab 114b.

It is noted that the above dimensions are identified solely for example purposes and can vary based on particular design requirements. However, one particular advantage is presented by including an over-surface clearance that is larger than an over-air clearance. For example, one advantageous design is directed to having a 2-inch over-surface distance that allows connection to a stab at 1 inch or less by including a dielectric barrier.

The angled stabs 114a-114d are advantageous at least because standard plug-in unit spacing can be achieved, which means that there is no requirement to redesign or use special (i.e., costly) plug-in unit units. Accordingly, the angled shape of the stabs 114a-114d provides flexibility in designing the busway system 100 such that the busway system 100 does not require insulated stabs and complies with UL-required insulation clearances. As a result of this flexibility, for example, the busway system 100 is less expensive than a system that has insulated stabs, it is simpler to assemble, and it provides improved and consistent results.

Some exemplary dimensions are described below in accordance with one optional embodiment. For example, the upper tip 204a of the first upper stab 114a is separated from the upper tip 204b of the second upper stab 114b, which is the closest tip of any of the other stabs 114b-114d, by an over-air clearance of approximately 0.9 inches (OAC1). The lower tip 204c of the first lower stab 114c is separated from the lower tip 204d of the second lower stab 114d by an over-air clearance of approximately 0.75 inches (OAC2). To comply with the UL requirements, which require at least 1 inch of over-air clearance for uninsulated stabs, the second plastic wall 120 of the molded plastic base 108 is positioned between the first pair of uninsulated stabs 114a, 114c and the second pair of uninsulated stabs 114b, 114d to meet the required "at least 1 inch" UL requirement for over-air clearance. Thus, the second plastic wall 120 changes the measured distance to achieve the UL insulation-related requirements even when the over-air clearance between uninsulated stabs is well below the 1 inch requirement, e.g., 0.75 or 0.9 inches.

The upper tip 204a of the first upper stab 114a is separated from the lower tip 204c of the first lower stab 114c by an over-air clearance of approximately 1.25 inches (OAC3). Similarly, the upper tip 204b of the second upper stab 114b is separated from the lower tip 204d of the second lower stab 114d by an over-air clearance of approximately 1.25 inches (OAC4). Clearly, the two over-air clearances of 1.25 inches—OAC3 and OAC4—are within the UL-required over-air clearance.

Furthermore, the exemplary embodiment of FIGS. 4A-4B has at least one over-surface clearance that is well below the UL-required over-surface clearance of at least 2 inches. For example, the upper base 202b of the second upper stab 114b is separated from the lower base 202d of the second lower stab 114d by an over-surface clearance of approximately 0.25 inches (OSC1). The right insulating sheet 206b forms an insulation wall between the upper base 202b and the lower base 202 and, as such, changes the measured distance to satisfy the UL-required over-surface clearance of at least 2 inches, even though the second upper stab 114b and the second lower stab 114d are uninsulated stabs and have an over-surface clearance of only 0.25 inches. A similar over-surface clearance can be achieved with respect to the first pair of uninsulated stabs 114a, 114c.

According to an optional embodiment, the over-surface clearance between the upper base 202a of the first upper stab 114a and the upper base 202b of the second upper stab 114b is approximately 2.1 inches (OSC2). Also, according to another optional embodiment the width (designated as SW1 and SW2 in FIG. 4B) of each stab 114a-114d is approximately 1.5 inches to accommodate, for example, existing jaws with ampacities up to 600 Amps.

Figure 5:
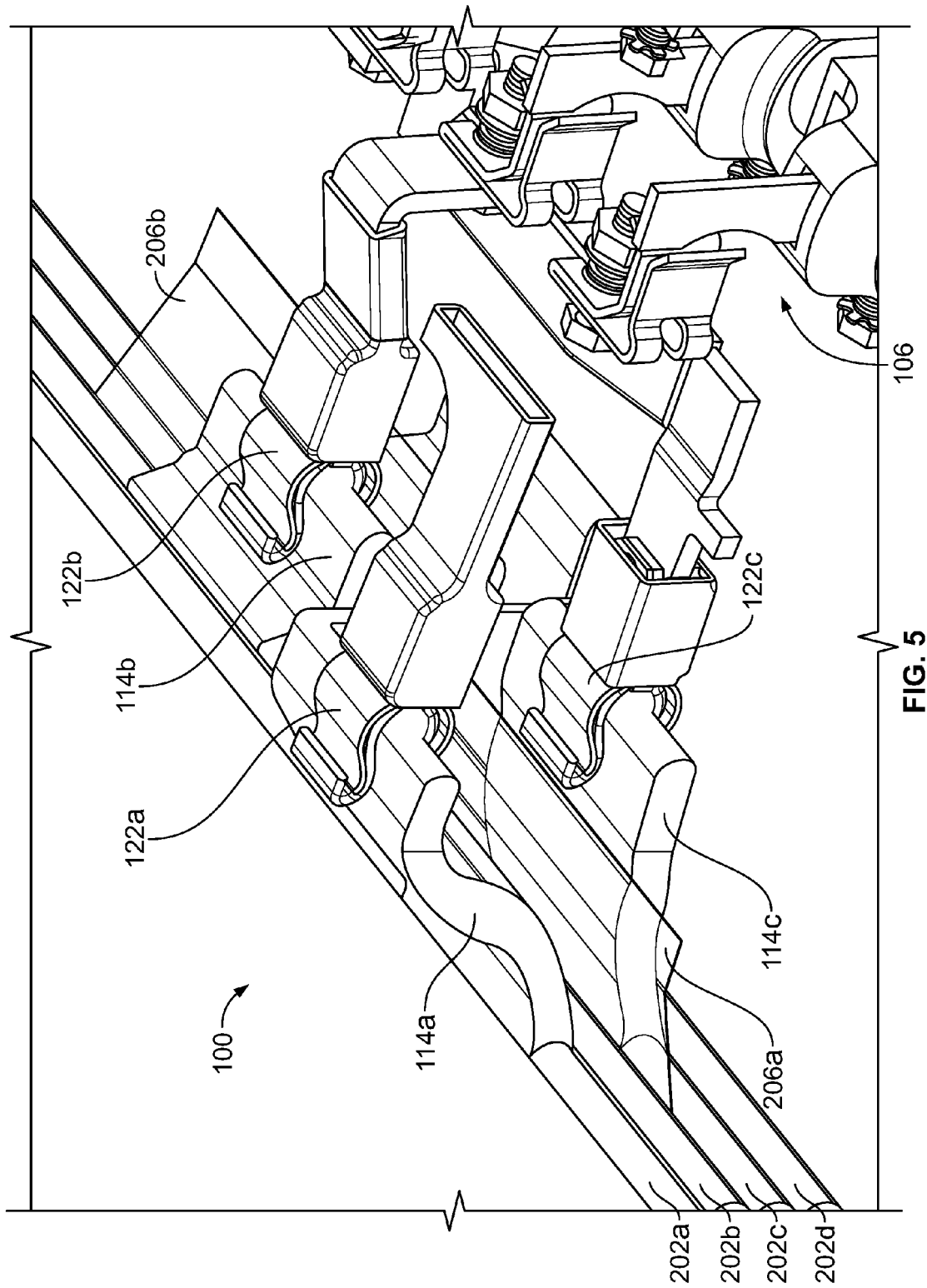
FIG. 5 is a perspective view illustrating coupling between a plurality of stabs and a plurality of jaws, according to yet another alternative embodiment.

Referring to FIG. 5, the mounting between the plug-in unit 106 and the busway system 100 is illustrated in more detail. Specifically, the set of electrical jaws 122a-122d is attached, correspondingly, to the uninsulated stabs 114a-114d (wherein the jaw 122d corresponding to the second lower stab 114d is not shown). As illustrated, the insulation sheet 206a, 206b insulates the upper stabs 114a, 114b and their corresponding jaws 122a, 122b from the lower stabs 114c, 114d and their corresponding jaws 122c, 122d. Optionally, another embodiment can include a stab extending from a first busbar and a bolted joint extending from the stab to a second busbar.

Figure 6A:
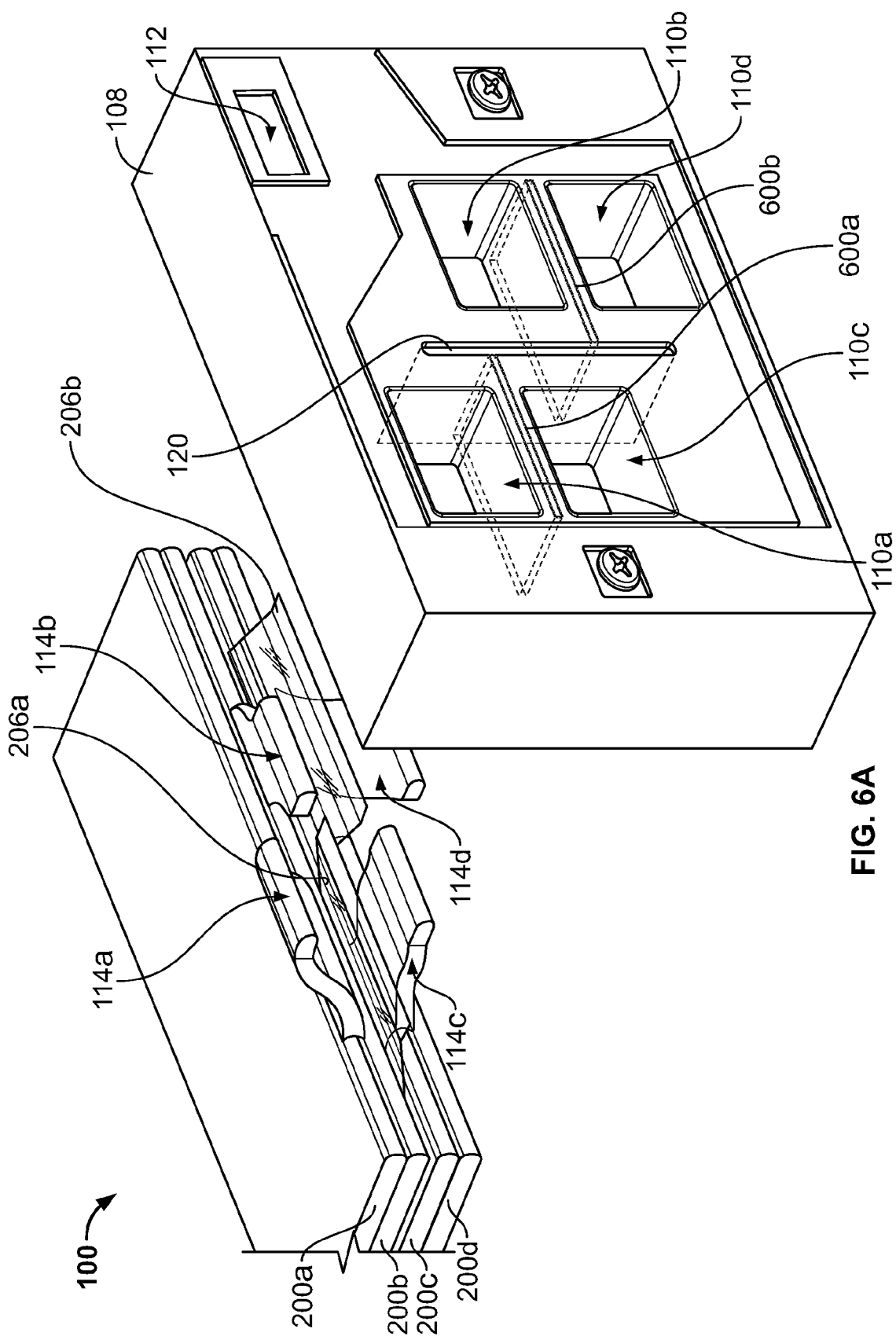
FIG. 6A is a perspective view of a molded plug-in opening base, according to yet another alternative embodiment.
Figure 6B:
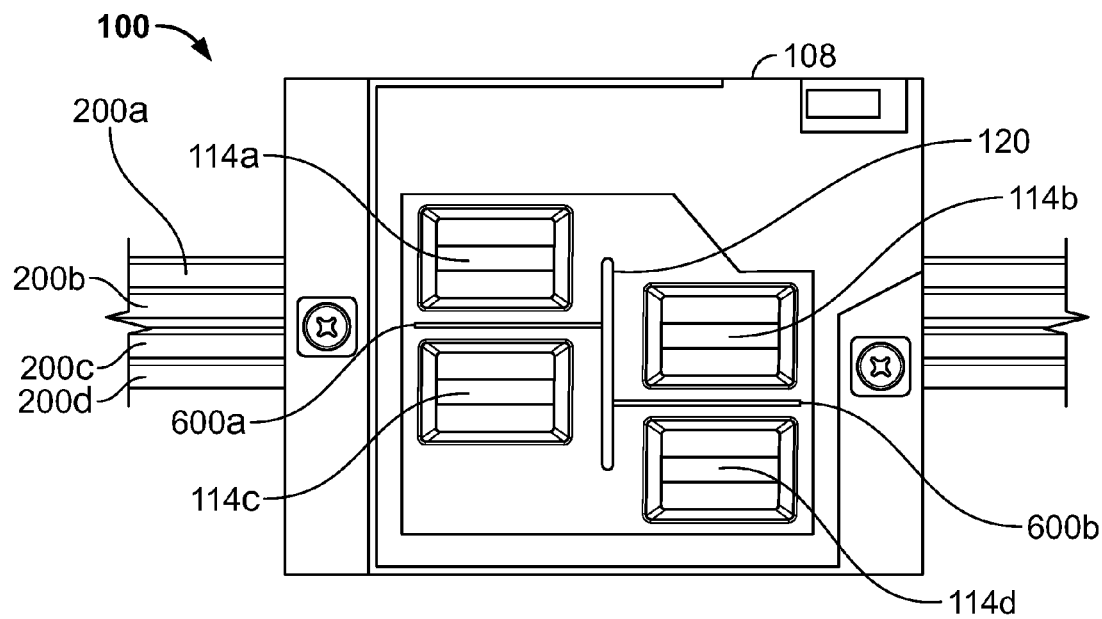
FIG. 6B is a front view of the molded plug-in opening base of FIG. 5A.

Referring to FIGS. 6A and 6B, in accordance with an alternative embodiment, the plug-in opening base 108 can include a pair of insulation receivers 600a, 600b to guide (or control) the insulation sheet 206a, 206b. According to one example, the receivers 600a, 600b are generally a pair of parallel plates having a space in-between to receive the sheet 206a, 206b. Specifically, as the plug-in opening base 108 is mounted in the busway system 100, each of the insulation receivers 600a, 600b can receive within a corresponding insulation sheet 206a, 206b.

After being inserted in a respective insulation receiver 600a, 600b, the free end of the insulation sheet 206a, 206b, which is initially freely movable, is now fixed in place to ensure proper insulation between the upper stabs 114a, 114b, and the lower stabs 114c, 114d. One advantage associated with the insulation receivers 600a, 600b is that the insulation sheet 206a, 206b is not improperly forced towards the busbars 200a-200d such that insulation sheet 206a, 206b does not fully extend away (as intended) from the busbars 200a-200d.

Figure 7:
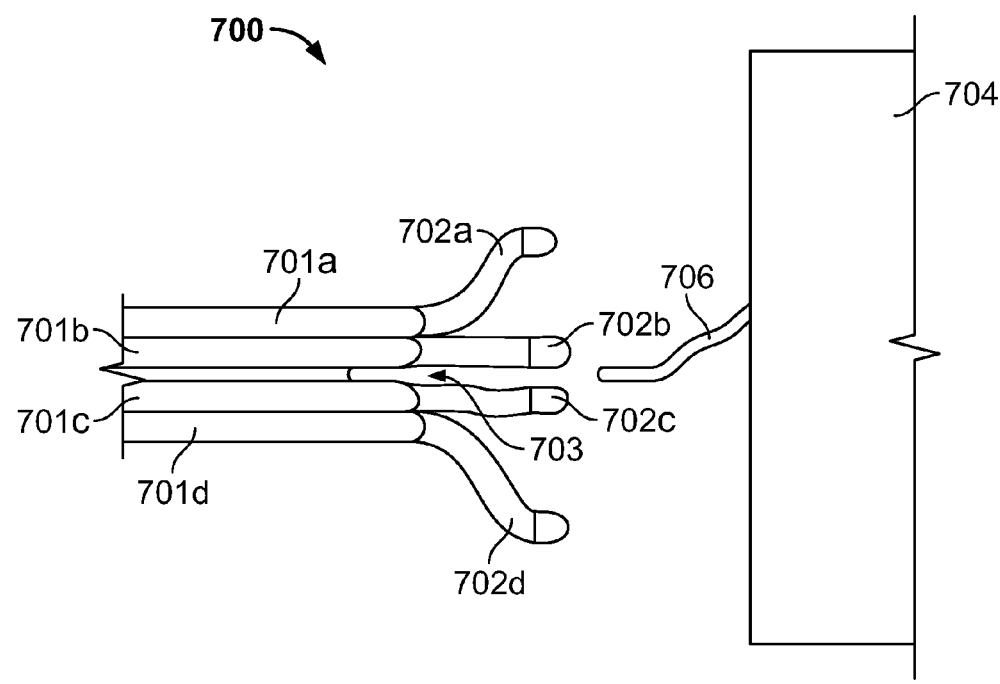
FIG. 7 is a side view representation of a molded plug-in opening base and busbar arrangement, according to yet another alternative embodiment.

Referring to FIG. 7, in accordance with another alternative embodiment, a busway system 700 includes a plurality of busbars 701a-701d, including a first busbar 701a, a second busbar 701b, a third busbar 701c, and a fourth busbar 701d. A plurality of uninsulated stabs 702a-702d extend from the plurality of busbars 701a-701d, as described above with respect to FIGS. 1A-6B. The stabs 702a-702d include two upper stabs 702a, 702b and two lower stabs 702c, 702d.

However, instead of using an insulation sheet similar to the insulating sheet 206a, 206b, a deep groove 703 is formed between the second busbar 701b and the third busbar 701c (e.g., by milling exterior edges of the busbars 701b, 701c). Alternatively, the deep groove 703 can be formed between any of the busbars 701a-701d, including between any of the busbars 701a-701d and a housing of the busway system 700.

To comply with the UL over-air clearance requirements, a plug-in unit base 704 is formed such that it includes a flange barrier 706 that is inserted into the deep groove 703. The flange barrier 706 insulates the upper stabs 702a, 702b from the lower stabs 702c, 702d.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims. For example, although the above-described embodiments refer to a busway system, one or more of the described features can be included in any "stack bus" arrangement. The "stack bus" arrangement can be applied in any application in which space is restricted.

According to another alternative embodiment, the angled stab design described above can be advantageously used with other insulating methods, such as epoxy (or similarly coated) insulating methods. Some manufacturers invest significant costs and labor for cleaning an "electrical connection" area after an epoxy coating has been applied to a busbar and associated stabs. However, using the angled stab design described in the present application (in which the over-surface clearance is larger than the over-air clearance) helps increase the distance between an epoxy coated area of a busbar stab and the "electrical connection" area. As such, the likelihood of inadvertently applying epoxy to the "electrical connection" area is greatly reduced. In turn, labor and costs associated with cleaning the "electrical connection" are also reduced. According to yet another alternative embodiment, other type of insulation sheet material can be used instead of or in addition to MYLAR® material, e.g., paper. In fact, the insulation sheet material can be any dielectric material produced in sheet form.

What is claimed is:

1. A busway system, comprising:
a busway housing;
a plurality of busbars arranged in a flat stacked configuration, the busbars being located at least in part within the housing and including a first busbar, a second busbar, a third busbar, and a fourth busbar; and
at least one plug-in opening including a plurality of uninsulated stabs, the plurality of uninsulated stabs including
a first pair of uninsulated stabs including
a first upper stab having a first upper base attached directly to the first busbar at a first length portion of the busbars, the first upper stab having a first upper tip extending away from the first upper base, and
a first lower stab having a first lower base attached directly to the third busbar at the first length portion of the busbars, the first lower stab having a first lower tip extending away from the first lower base, and
a second pair of uninsulated stabs including
a second upper stab having a second upper base attached directly to the second busbar at a second length portion of the busbars, the second upper stab having a second upper tip extending away from the second upper base, and
a second lower stab having a second lower base attached directly to the fourth busbar at the second length portion of the busbars, the second lower stab having a second lower tip extending away from the second lower base;
wherein each one of the first upper tip and the first lower tip is angled at a third length portion of the busbars toward the second upper tip and the second lower tip, the third length portion of the busbars being located between the first length portion of the busbars and the second length portion of the busbars.

2. The busway system of claim 1, further comprising an insulation sheet inserted between the second busbar and the third busbar, the insulation sheet separating the first upper stab from the first lower stab and the second upper stab from the second lower stab.

3. The busway system of claim 1, wherein the insulation sheet is a MYLAR sheet stock material.

4. The busway system of claim 1, further comprising an insulation sheet inserted between the first busbar and an interior surface of the busway housing, the first busbar being adjacent to the interior surface of the busway housing.

5. The busway system of claim 1, further comprising an insulation MYLAR sheet inserted between two adjacent ones of the plurality of busbars, the insulation MYLAR sheet having an inner width generally equal to a width of the plurality of busbars, the insulation MYLAR sheet having an outer width defining an overhanging flange at the plug-in opening.

6. The busway system of claim 5, wherein the overhanging flange is cut in a central area to form two stab flanges, each of the two stab flanges having an end that is freely movable.

7. The busway system of claim 1, further comprising a molded plastic base for the plug-in opening, the molded plastic base being attachable to the plug-in opening such that an insulation wall of the molded plastic base separates the first pair of uninsulated stabs and the second pair of uninsulated stabs.

8. The busway system of claim 1, wherein at least one of the plurality of uninsulated stabs has an L-shape configuration.

9. The busway system of claim 1, wherein at least one of the plurality of uninsulated stabs is fabricated with extrusion or formed roll stock material.

10. The busway system of claim 1, wherein the first upper base of the first upper stab is separated from the second upper base of the second upper stab by an over-surface clearance of at least 2 inches, the first upper tip of the first upper stab being separated from the second upper tip of the second upper stab by an over-air clearance of less than 1 inch.

11. The busway system of claim 1, wherein the first upper base of the first upper stab is separated from the first lower base of the first lower stab by an over-surface clearance of less than 2 inches, the first upper stab and the first lower stab being separated by a MYLAR insulation sheet inserted between two adjacent ones of the plurality of busbars.

12. The busway system of claim 11, wherein the over-surface clearance is approximately 0.25 inches.

13. The busway system of claim 1, further comprising a molded plastic base for the plug-in opening, the molded plastic base including
a first insulation wall being oriented generally parallel to a length of the plurality of busbars, the first insulation wall separating the first upper stab from the first lower stab an the second upper stab from the second lower stab; and
a second insulation wall being oriented generally perpendicular to the length of the plurality of busbars, the second insulation wall separating the first pair of uninsulated stabs from the second pair of uninsulated stabs.

14. A busway system, comprising:
a plurality of busbars arranged in a flat stacked configuration and having a length and a width; and
a left upper stab having a left upper base in direct contact with one of the busbars at a first length portion of the busbars, the left upper stab further having a left upper tip extending away from the first upper base and angled at the length of the busbars such that the left upper tip is positioned at least in part at a second length portion of the busbars, the left upper stab being an uninsulated stab.

15. The busway system of claim 14, wherein the left upper stab has an L-shape configuration.

16. The busway system of claim 14, further comprising a left lower stab having a left lower base in direct contact with another one of the busbars and being positioned at the first length portion of the busbars in overlapping manner with the left upper stab, the left lower base being separated from the left upper base by an over-surface clearance of less than 2 inches, the left lower base and the left upper base being insulated from each other via an insulation sheet inserted between two adjacent ones of the busbars, the left lower stab being an uninsulated stab.

17. The busway system of claim 14, further comprising a right upper stab having a right upper base in direct contact with another one of the busbars and being positioned at a second length portion of the busbars in a non-overlapping manner with the left upper stab, the right upper base and the left upper base being insulated via a wall of a plug-in opening base, the right upper stab being an uninsulated stab.

18. The busway system of claim 17, wherein an over-air clearance of less than 1 inch separates the right upper tip of the right upper stab from a left upper tip of the left upper stab.

19. The busway system of claim 14, further comprising a plug-in unit base mountable to a plug-in opening in which the left upper stab is located, the base having an insulation wall oriented generally parallel to the length of the busbars, the insulation wall separating the left upper stab from a left lower stab that is located in an overlapping manner with respect to the left upper stab, the insulation wall being inserted in a receiving groove formed between two adjacent ones of the plurality of busbars.

20. The busway system of claim 19, wherein the base includes another insulation wall separating the left upper stab from a right upper stab that is located in a non-overlapping manner with respect to the left upper stab, the another insulation wall being oriented generally perpendicular to the length of the busbars.

* * * * *